United States Patent

Iwase

(10) Patent No.: US 10,677,182 B2
(45) Date of Patent: Jun. 9, 2020

(54) METHOD FOR CONTROLLING ENGINE

(71) Applicant: Yanmar Co., Ltd., Osaka-shi, Osaka-fu (JP)

(72) Inventor: Atsuhito Iwase, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/091,463

(22) PCT Filed: Apr. 4, 2017

(86) PCT No.: PCT/JP2017/014063
§ 371 (c)(1),
(2) Date: Oct. 4, 2018

(87) PCT Pub. No.: WO2017/175750
PCT Pub. Date: Oct. 12, 2017

(65) Prior Publication Data
US 2019/0153967 A1 May 23, 2019

(30) Foreign Application Priority Data

Apr. 5, 2016 (JP) ................................. 2016-075856

(51) Int. Cl.
*F02D 41/00* (2006.01)
*F02D 41/10* (2006.01)
(Continued)

(52) U.S. Cl.
CPC ............. *F02D 41/10* (2013.01); *F02D 1/02* (2013.01); *F02D 21/08* (2013.01); *F02D 41/005* (2013.01);
(Continued)

(58) Field of Classification Search
None
See application file for complete search history.

(56) References Cited

U.S. PATENT DOCUMENTS 5,704,340 A * 1/1998 Togai .................. F02D 41/0072
123/676
5,722,363 A * 3/1998 Iida ......................... F02D 41/10
123/305
(Continued)

FOREIGN PATENT DOCUMENTS

EP 0774574 A1 * 5/1997 ......... F02D 41/0072
EP 0892165 A2 1/1999
(Continued)

OTHER PUBLICATIONS

International Search Report dated Jul. 4, 2017 issued in corresponding PCT Application PCT/JP2017/014063.
(Continued)

*Primary Examiner* — Kevin R Steckbauer
(74) *Attorney, Agent, or Firm* — Norton Rose Fulbright US LLP

(57) ABSTRACT

In a method for controlling an engine, based on a control map of an engine speed N and a fuel injection amount Q of a common-rail fuel injection unit, a controller calculating the fuel injection amount Q depending on the engine speed N, calculating an injection amount deviation $\Delta Qn$ as a fuel injection amount increase, and determining that an engine is in a transient state if the injection amount deviation $\Delta Qn$ exceeds a reference transient injection amount deviation A2 or if a transient injection amount deviation count Xq is larger than or equal to a reference transient injection amount deviation count X2. If it is determined that the engine is in the transient state, the controller controls an EGR unit and a boost controller according to an excess air ratio $\lambda$ that is an indicator indicating the state of the engine.

20 Claims, 12 Drawing Sheets

(51) Int. Cl.
*F02D 41/04* (2006.01)
*F02D 43/00* (2006.01)
*F02D 41/02* (2006.01)
*F02D 45/00* (2006.01)
*F02D 1/02* (2006.01)
*F02D 21/08* (2006.01)
*F02D 41/14* (2006.01)
*F02M 26/05* (2016.01)
*F02M 26/46* (2016.01)
*F02M 26/21* (2016.01)
*F02M 26/00* (2016.01)

(52) U.S. Cl.
CPC ..... *F02D 41/0007* (2013.01); *F02D 41/0052* (2013.01); *F02D 41/02* (2013.01); *F02D 41/04* (2013.01); *F02D 41/1458* (2013.01); *F02D 43/00* (2013.01); *F02D 45/00* (2013.01); *F02M 26/05* (2016.02); *F02M 26/46* (2016.02); *F02D 2200/0616* (2013.01); *F02D 2200/101* (2013.01); *F02D 2250/36* (2013.01); *F02D 2250/38* (2013.01); *F02M 26/21* (2016.02); *F02M 2026/009* (2016.02); *Y02T 10/47* (2013.01)

(56) References Cited

U.S. PATENT DOCUMENTS

| | | | | |
|---|---|---|---|---|
| 7,318,412 | B2* | 1/2008 | Ito | F02D 41/062 123/431 |
| 8,967,116 | B2* | 3/2015 | Leone | F02D 9/1055 123/399 |
| 9,951,701 | B2* | 4/2018 | Henry | F02M 26/08 |
| 2006/0207557 | A1* | 9/2006 | Ito | F02D 41/062 123/431 |
| 2014/0090627 | A1 | 4/2014 | Nagasawa | |
| 2016/0084181 | A1* | 3/2016 | Henry | F02M 26/17 123/568.21 |
| 2019/0153967 | A1* | 5/2019 | Iwase | F02D 41/04 |

FOREIGN PATENT DOCUMENTS

| | | |
|---|---|---|
| EP | 0892165 A3 | 10/2000 |
| EP | 2196656 A1 | 6/2010 |
| JP | 6-050181 A | 2/1994 |
| JP | 6-101525 A | 4/1994 |
| JP | 10-037786 A | 2/1998 |
| JP | 10-318047 A | 12/1998 |
| JP | 2000-073822 A | 3/2000 |
| JP | 2001-241345 A | 9/2001 |
| JP | 2005214083 A | 8/2005 |
| JP | 2012-021443 A | 2/2012 |

OTHER PUBLICATIONS

European Search Report dated Mar. 29, 2019 issued in corresponding European Application No. 17779128.2.

* cited by examiner

METHOD FOR CONTROLLING ENGINE

CROSS REFERENCES TO RELATED APPLICATIONS

This application is a national stage application pursuant to 35 U.S.C. § 371 of International Application No. PCT/JP2017/014063, filed on Apr. 4, 2017 which claims priority of under 35 U.S.C. § 119 to Japanese Patent Application No. 2016-075856 filed on Apr. 5, 2016, the disclosures of which are hereby incorporated by reference in their entireties.

TECHNICAL FIELD

The present invention relates to techniques on methods for controlling engines and more specifically to techniques for reducing the amounts of NOx emission and smoke emission of an engine including an EGR unit.

BACKGROUND ART

In a conventionally known structure of an engine, in accordance with a control map of an engine speed and a fuel injection amount, a controller calculates the fuel injection amount dependent on the engine speed, calculates an injection amount deviation as a fuel injection amount increase, and determines that the engine is in a transient state if the injection amount deviation exceeds a predetermined reference injection amount deviation. The structure is disclosed in Patent Literature 1 (PTL1).

According to such a conventional method for controlling an engine, an EGR valve in an EGR unit is fully closed if the controller determines that the engine is in a transient state as illustrated in FIG. 13, and response of the engine is thus secured while suppressing or reducing clogging of a DPF.

CITATION LIST

Patent Literature

PTL1: Japanese Patent Application Laid-Open No. 2012-21443

SUMMARY OF INVENTION

Technical Problem

When, however, the EGR opening is caused to be a fully closed regardless of the engine state if the engine is determined as being in a transient state as in the conventional method for controlling an engine illustrated in FIG. 13, the EGR rate may decrease while the NOx emission amount may increase. For this reason, the conventional method for controlling an engine in a transient state leaves a difficulty in conforming to stricter emission standards.

In addition, in the conventional method for controlling an engine, determination conditions are set so that the determination on a transient state can be made easily to secure response to quick load application or acceleration, which is typical of an industrial engine, and a larger amount of NOx is likely to be emitted.

Some aspects of the present invention have been made in view of such problems under the current circumstances and are aimed at providing a method for controlling an engine, which may achieve reduction in the amounts of NOx emission and smoke emission from the engine in a transient state.

Solution to Problems

The problems that some aspects of the present invention attempt to solve are described above and means for solving the problems are described hereafter.

That is, a method for controlling an engine according to a first illustrative aspect of the present invention is for an engine including a fuel injection unit, a boost controller that performs limitation on a maximum injection amount of the fuel injection unit, an EGR unit that causes exhaust gas to recirculate in an intake pipe, and a controller that performs control on the boost controller and the EGR unit, and the method causes the controller to, in accordance with a control map of an engine speed and a fuel injection amount of the fuel injection unit, calculate the fuel injection amount dependent on the engine speed, calculate an injection amount deviation as a fuel injection amount increase, and determine that the engine is in a transient state if the number of times the injection amount deviation exceeds a reference transient injection amount deviation, is larger than or equal to a reference number of times. If it is determined that the engine is in the transient state, the controller is caused to calculate an excess air ratio that is an indicator indicating a state of the engine and perform the control on the EGR unit and the boost controller according to the excess air ratio.

A method for controlling an engine according to a second illustrative aspect of the present invention is for an engine including a fuel injection unit, a boost controller that performs limitation on a maximum injection amount of the fuel injection unit, an EGR unit that causes exhaust gas to recirculate in an intake pipe, and a controller that performs control on the boost controller and the EGR unit, and the method causes the controller to, in accordance with a control map of an engine speed and a fuel injection amount of the fuel injection unit, calculate the fuel injection amount dependent on the engine speed, calculate an injection amount deviation as a fuel injection amount increase, and determine that the engine is in a transient state if the injection amount deviation exceeds a predetermined reference injection amount deviation. If it is determined that the engine is in the transient state, the controller is caused to calculate an excess air ratio that is an indicator indicating a state of the engine and perform the control on the EGR unit and the boost controller according to the excess air ratio. The control on the EGR unit and the boost controller by the controller includes a first step in which the excess air ratio is compared with a first threshold, and a second step in which the excess air ratio is compared with a second threshold if the excess air ratio is smaller than the first threshold; and in the first step, if the excess air ratio is larger than or equal to the first threshold, the EGR unit and the boost controller are maintained in a steady operation state, and in the second step, if the excess air ratio is larger than or equal to the second threshold, the limitation by the boost controller is decreased while opening an EGR valve of the EGR unit at an intermediate opening, and if the excess air ratio is smaller than the second threshold, the limitation by the boost controller is increased while fully closing the EGR valve.

In the method for controlling the engine according to a third illustrative aspect of the present invention, the control on the EGR unit and the boost controller by the controller may include a first step in which the excess air ratio is compared with a first threshold, and a second step in which the excess air ratio is compared with a second threshold if the excess air ratio is smaller than the first threshold, in the first step, if the excess air ratio is larger than or equal to the first threshold, the EGR unit and the boost controller may be maintained in a steady operation state, and in the second step, if the excess air ratio is larger than or equal to the second threshold, the limitation of the boost controller may be decreased while opening an EGR valve of the EGR unit at an intermediate opening, and if the excess air ratio is smaller than the second threshold, the limitation of the boost controller is increased while fully closing the EGR valve.

By the method for controlling the engine described above, fully closing the EGR valve can be avoided in a transient state and accordingly, a period during which the EGR valve is fully closed can be shortened and an operation state in which no smoke is caused can be maintained. As a result, the amounts of NOx emission and smoke emission can be reduced. Further, a response of the engine can be secured by reducing limitation by the boost controller.

In the method for controlling the engine according to a fourth illustrative aspect of the present invention, the controller may be caused to correct the control map according to the excess air ratio, and in the second step, if the excess air ratio is larger than or equal to the second threshold, a correction amount to the control map may be decreased, and if the excess air ratio is smaller than the second threshold, the correction amount to the control map may be increased.

By the method for controlling the engine described above, an operation state in which the amount of NOx emission is reduced can be maintained with reliability and accordingly, the amount of NOx emission can be reduced with higher reliability.

In the method for controlling the engine according to a fifth illustrative aspect of the present invention, a third step in which the controller is caused to determine whether the engine is in the transient state after an end of the second step may be further included.

By the method for controlling the engine described above, the control for a steady state can be recovered immediately at the time of exit from a transient state and accordingly, a period during which the EGR valve is fully closed can be shortened. As a result, the amount of NOx emission can be further reduced.

Advantageous Effects of Invention

Such methods for controlling an engine according to some aspects the present invention as described above can reduce the amounts of NOx emission and smoke emission from the engine in a transient state.

DESCRIPTION OF EMBODIMENTS

Described below is an embodiment of the invention.

Figure 1:
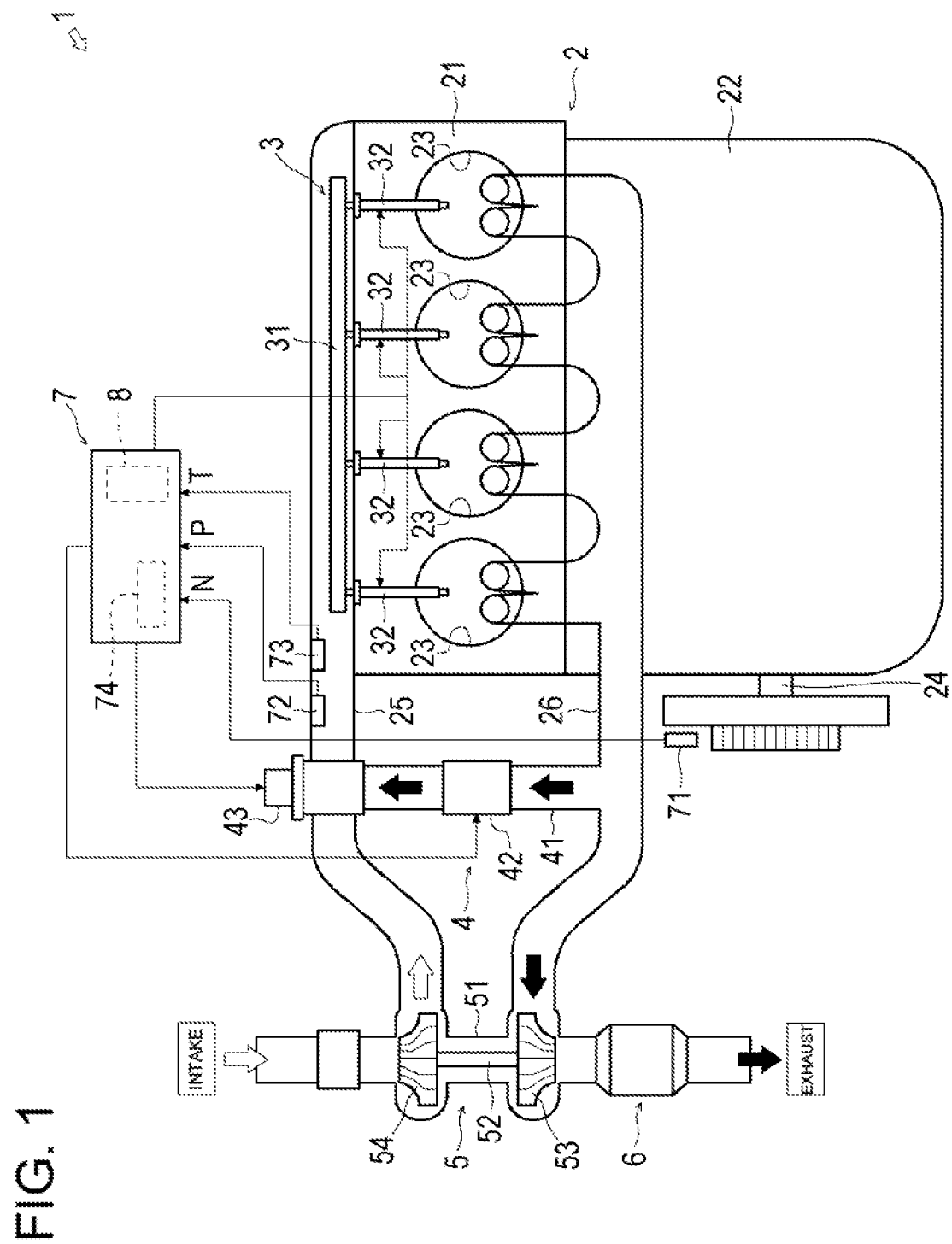
FIG. 1 is a schematic diagram illustrating an overall structure of an engine to which a control method according to an embodiment of the present invention is applied.
Figure 2:
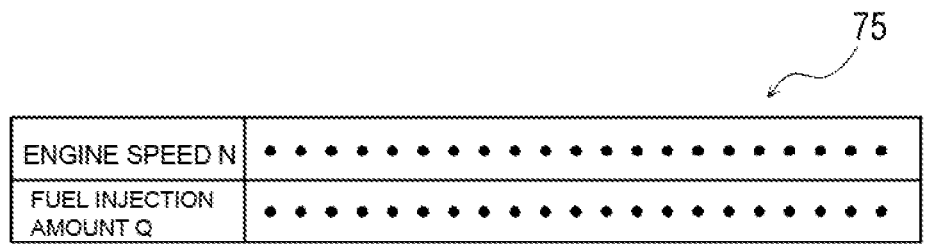
FIG. 2 is a chart illustrating a control map that defines relation between an engine speed and a fuel injection amount of a fuel injection unit.

An overall structure of an engine 1 as an object to which a control method according to one embodiment of the present invention is applied is described first with reference to FIGS. 1 and 2.

As illustrated in FIG. 1, the engine 1 is made up of an engine body 2, such as an inline-four diesel engine, a common-rail fuel injection unit 3 as a fuel injection unit, an exhaust gas recirculation (hereinafter referred to as "EGR") unit 4, a turbocharger 5, such as an exhaust turbine turbocharger, and an exhaust purifier 6.

In the engine body 2, a cylinder head 21 is fixed to an upper surface of a cylinder block 22. The cylinder block 22 pivotally supports a crank shaft 24 so that the crank shaft 24 is rotatable and four cylinders 23 are evenly spaced in the axial direction of the crank shaft 24 in the cylinder block 22. An intake pipe 25 is connected to one side of the cylinder head 21 through an unillustrated intake manifold, while an exhaust pipe 26 is connected to the other side of the cylinder head 21 through an unillustrated exhaust manifold.

Further, the exhaust purifier 6 including, for example, an unillustrated diesel oxidation catalyst (DOC) and an unillustrated diesel particulate filter (DPF) is disposed toward the exhaust outlet of the exhaust pipe 26. In the exhaust purifier 6, the DOC oxidizes carbon monoxide (CO), hydrocarbon (HC), and soluble organic fractions (SOF) in exhaust gas and particulate matters (PM) in the exhaust gas are trapped and oxidized through the DPF to purify the exhaust gas.

Moreover, a number-of-revolutions sensor 71, which detects the number of revolutions of the crank shaft 24, is disposed near the crank shaft 24. The number-of-revolutions sensor 71 is connected to a controller 7 and the detected number of revolutions of the crank shaft 24 is input to the controller 7 as an engine speed N.

The common-rail fuel injection unit 3 is made up of, for example, an unillustrated supply pump that makes the pressure of fuel high, a common rail 31 that stores the fuel with the pressure made high in the supply pump, and injectors 32 that inject the high-pressure fuel in the common rail 31 into the cylinders 23. The injectors 32 are connected to the controller 7 and the injectors 32 inject the fuel according to a signal from the controller 7.

In the turbocharger 5, a revolving shaft 52 is rotatably and pivotally supported in a housing 51 that communicates with the intake pipe 25 and the exhaust pipe 26, and a turbine 53 is fixed to the revolving shaft 52 toward the exhaust pipe 26 while a compressor 54 is fixed to the revolving shaft 52 toward the intake pipe 25.

With this structure, when energy of the exhaust gas that flows in the exhaust pipe 26 causes the turbine 53 to revolve, the compressor 54 that revolves together with the turbine 53 with interposition of the revolving shaft 52 compresses intake air, and the compressed intake air is sent into the cylinders 23. Accordingly, the filling efficiency of the intake air in the cylinders 23 can be increased and output of the engine 1 can be increased.

In the intake pipe 25 on the intake air downstream side of the compressor 54, a turbocharging pressure sensor 72 is disposed and detects the pressure of the intake air compressed by the compressor 54 (hereinafter referred to as the "turbocharging pressure"). The turbocharging pressure sensor 72 is connected to the controller 7 and the detected turbocharging pressure is input to the controller 7 as a turbocharging pressure P of the turbocharger 5.

In the intake pipe 25 on the intake air downstream side of the compressor 54, an intake air temperature sensor 73 is further disposed and detects a temperature T of the intake air compressed by the compressor 54 (hereinafter referred to as the "intake air temperature T"). The intake air temperature sensor 73 is connected to the controller 7 and the detected intake air temperature is input to the controller 7 as the intake air temperature T.

In the engine 1, the controller 7 estimates and calculates an excess air ratio $\lambda$ (hereinafter also referred to as the "engine state $\lambda k$"), which is an indicator indicating the state of the engine 1, according to the turbocharging pressure P detected by the turbocharging pressure sensor 72 and the intake air temperature T detected by the intake air temperature sensor 73.

The excess air ratio $\lambda$ indicates the value that is obtained by dividing the mass of air actually supplied by the mass of minimum air theoretically needed and is an indicator indicating the degree of redundancy of air in a fuel-air mixture. The excess air ratio $\lambda$ equals a value obtained by dividing an actual air-fuel ratio by a stoichiometric air-fuel ratio.

The EGR unit 4 is made up of, for example, an EGR pipe 41 in which the exhaust gas caused to recirculate in intake air flows, an EGR cooler 42 that cools the exhaust gas in the EGR pipe 41, and an EGR valve 43 that opens or closes the EGR pipe 41. The EGR valve 43 included thereamong is connected to the controller 7 and the EGR valve 43 is opened or closed at a predetermined opening according to a signal from the controller 7.

In this structure, exhaust gas of an amount dependent on the opening of the EGR valve 43 is sent into an unillustrated combustion chamber in the engine body 2 through the EGR pipe 41 and a combustion temperature in the combustion chamber decreases because of a hypoxic atmosphere. Accordingly, the amount of NOx emission brought by high-temperature combustion may be reduced.

In the engine 1, in a steady state in which the engine speed is stable, control by which the EGR valve 43 is opened at a predetermined opening to cause exhaust gas to recirculate in the intake air (hereinafter referred to as the "EGR control") is performed. In contrast, in the engine 1, in a transient state caused by acceleration or load application, control suitable for the transient state (hereinafter referred to as the "transient-time control") is performed. In the transient-time control, the EGR control or control for fully closing the EGR valve is selected according to the engine state $\lambda$.

The EGR control and the transient-time control are performed on the basis of the engine speed N, a fuel injection amount Q of the common-rail fuel injection unit 3, the turbocharging pressure P, the intake air temperature T, and time that elapses after the EGR valve 43 has been closed (hereinafter referred to as the "elapsed time") J. The elapsed time J is measured by an unillustrated timer included in the controller 7.

The controller 7 is made up of, for example, an unillustrated central processing unit and a storage device 74. In the storage device 74 included thereamong, a control map 75 (see FIG. 2) that defines relation between the engine speed N and the fuel injection amount Q of the common-rail fuel injection unit 3 is stored, and the fuel injection amount Q dependent on the engine speed N is calculated for every predetermined time in accordance with the control map 75.

Further, the engine speed N detected for every predetermined time and the fuel injection amount Q calculated for every predetermined time are temporarily saved (hereinafter referred to as "buffered") in the storage device 74.

In the engine speed N buffered in the storage device 74, the engine speed that has been detected most recently (hereinafter referred to as the "preceding number of revolutions") is denoted as Nn, the engine speed that had been detected one time before the preceding number of revolutions Nn (hereinafter referred to as the "previous number of revolutions") is denoted as Nn−1, the value that is calculated by subtracting the preceding number of revolutions Nn from the previous number of revolutions Nn−1 (hereinafter referred to as the "number-of-revolutions deviation") is denoted as $\Delta Nn$ (=Nn−1−Nn), a speed desired for the engine 1 (hereinafter referred to as the "target number of revolutions") is denoted as Nset, and the value that is calculated by subtracting the preceding number of revolutions Nn from the target number of revolutions Nset (hereinafter referred to as the "target number of revolutions deviation") is denoted as $\Delta Nset$ (=Nset−Nn). Instead of the previous number of revolutions Nn−1, an engine speed that had been detected given times before the preceding number of revolutions Nn may be used to calculate the number-of-revolutions deviation $\Delta Nn$.

In the fuel injection amount Q buffered in the storage device 74, the fuel injection amount dependent on the preceding number of revolutions Nn (hereinafter referred to as the "preceding injection amount") is denoted as Qn, the fuel injection amount dependent on the previous number of revolutions Nn−1 (hereinafter referred to as the "previous injection amount") is denoted as Qn−1, and the value that is calculated by subtracting the previous injection amount Qn−1 from the preceding injection amount Qn (hereinafter referred to as the "injection amount deviation") is denoted as $\Delta Qn$ (=Qn−Qn−1). Instead of the previous injection amount Qn−1, a fuel injection amount dependent on an engine speed that had been detected given times before the preceding number of revolutions Nn may be used to calculate the injection amount deviation $\Delta Qn$.

In the controller 7, a buffering period is set for every engine speed so that data on the engine speed N and the fuel injection amount Q are updated a predetermined number of times at every revolution of the engine 1 (the crank shaft 24).

The controller 7 further includes a boost controller 8.

The boost controller 8 is a device for limiting the fuel injection amount Q of the common-rail fuel injection unit 3 and calculates a limit value of the fuel injection amount from the common-rail fuel injection unit 3 (hereinafter referred to as the maximum injection amount Qmax) according to the target minimum λ and the gaseous flow rate of each unit in the engine 1. The controller 7 limits the maximum injection amount Qmax according to a calculation result of the boost controller 8 and gives a command on the fuel injection amount Q to the common-rail fuel injection unit 3.

The controller 7 further stores a plurality of pieces of map information.

Figure 3:
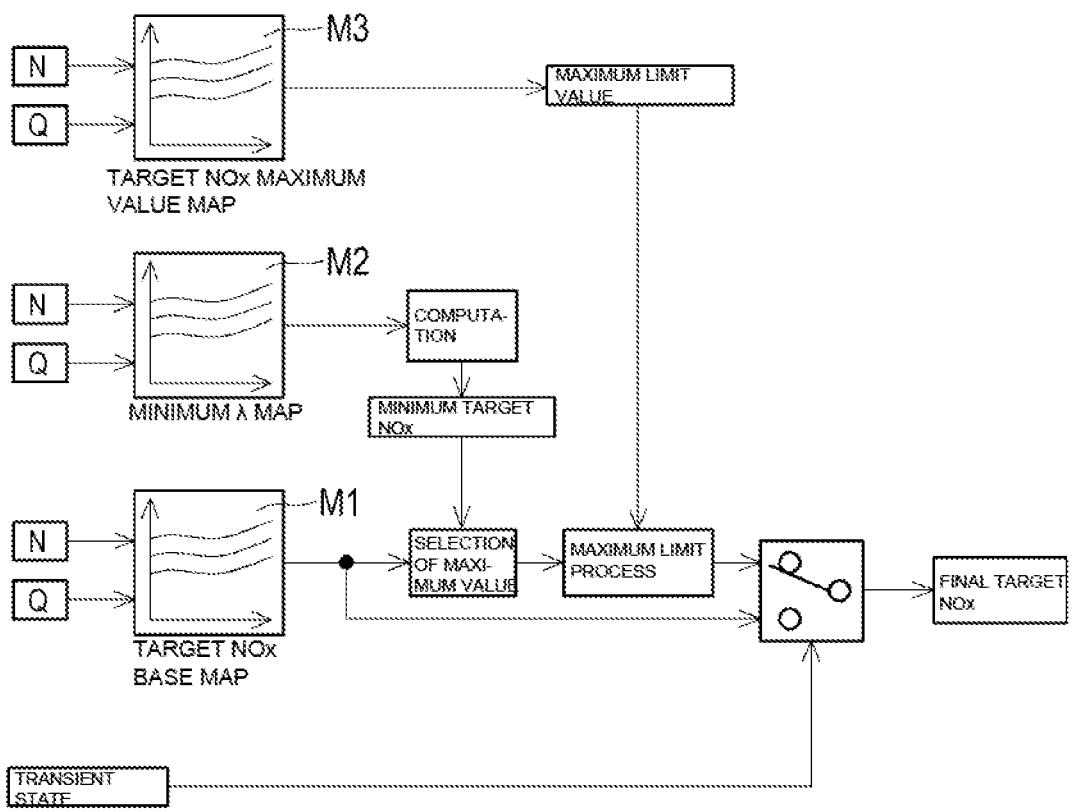
FIG. 3 is a diagram illustrating a calculation procedure of final target NOx in the method for controlling the engine according to the embodiment of the present invention.

A target NOx base map M1 illustrated in FIG. 3 is map information that defines target NOx in a steady operation state (a state that is not a transient state) for every operation point defined by the engine speed N and the fuel injection amount Q.

A minimum λ map M2 is map information that defines a value of the minimum λ for every operation point defined by the engine speed N and the fuel injection amount Q.

A target NOx maximum value map M3 is map information that defines the maximum value of the target NOx in a steady operation state (a state that is not a transient state) for every operation point defined by the engine speed N and the fuel injection amount Q.

Figure 4:
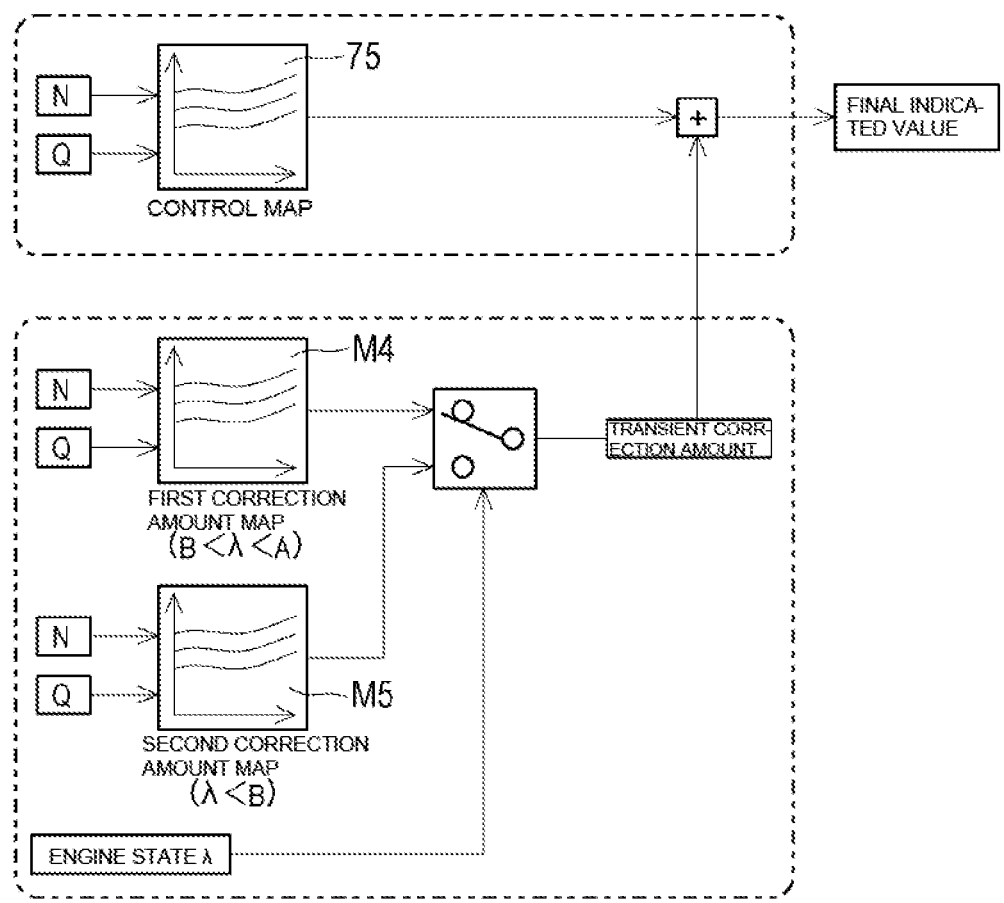
FIG. 4 is a diagram illustrating a switching procedure of a correction map according to an engine state λ in the method for controlling the engine according to the embodiment of the present invention.

As illustrated in FIG. 4, the control map 75 includes map information that defines correlation among a main injection timing, a pilot injection amount, a pilot injection timing, a pre-injection amount, a pre-injection timing, and an after-injection amount, and an after-injection timing in a steady operation state (a state that is not a transient state) for each operation point defined according to the engine speed N and the fuel injection amount Q.

A first correction amount map M4 is map information applied in a case where the engine state λ is smaller than a threshold A and exceeds a threshold B and map information that defines a correction amount to each element defined in a base map BM (a main injection timing, a pilot injection amount, a pilot injection timing, a pre-injection amount, a pre-injection timing, an after-injection amount, and an after-injection timing) for every operation point defined by the engine speed N and the fuel injection amount Q.

A second correction amount map M5 is map information applied in a case where the engine state λ is smaller than the threshold B and map information that defines a correction amount to each element defined in a base map BM (a main injection timing, a pilot injection amount, a pilot injection timing, a pre-injection amount, a pre-injection timing, an after-injection amount, and an after-injection injection timing) for every operation point defined by the engine speed N and the fuel injection amount Q.

The set values in the first correction amount map M4 are smaller than the set values in the second correction amount map M5, and a correction amount is caused to be larger in a case where the second correction amount map M5 is applied (that is, a case where the engine state λ is smaller than the threshold B) than in a case where the first correction amount map M4 is applied (that is, a case where the engine state λ is smaller than the threshold A and exceeds the threshold B).

Figure 5:
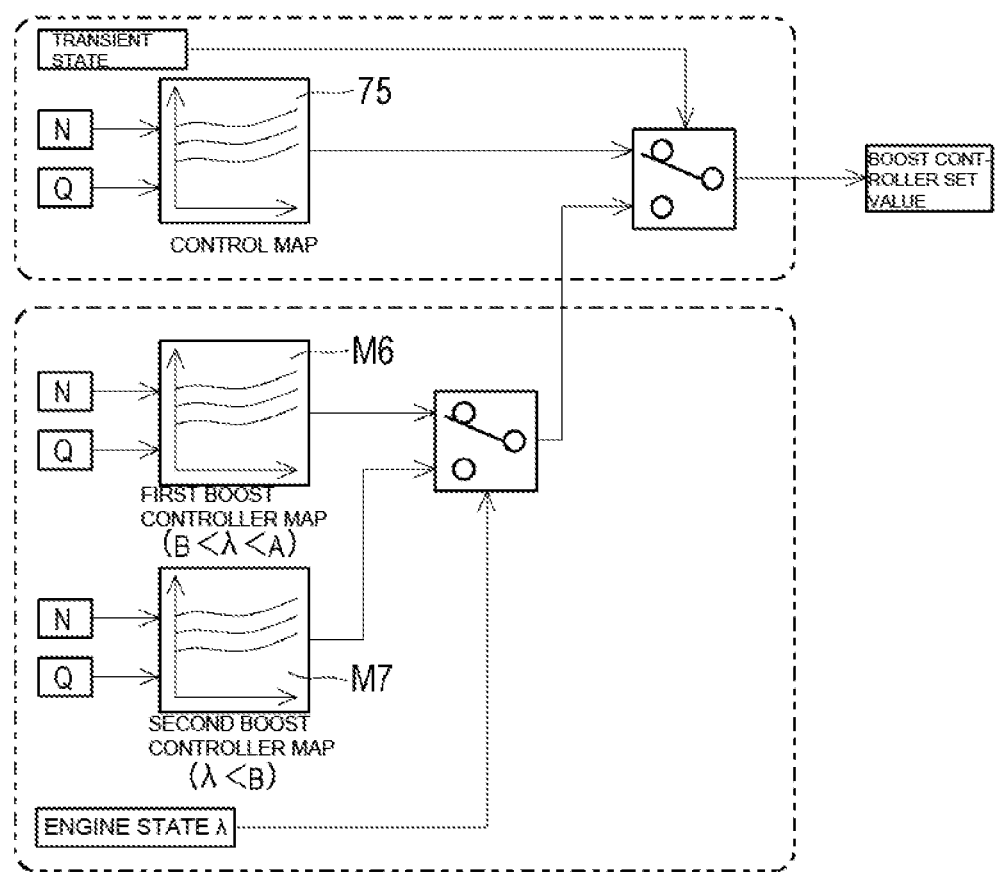
FIG. 5 is a diagram illustrating a switching procedure of a boost controller map according to the engine state λ and transient state determination in the method for controlling the engine according to the embodiment of the present invention.

As illustrated in FIG. 5, the control map 75 further includes information that defines set values of the boost controller 8 in a steady operation state (a state that is not a transient state) for every operation point defined by the engine speed N and the fuel injection amount Q.

A first boost controller map M6 is map information applied in a case where the engine state λ is smaller than the threshold A and exceeds the threshold B and map information that defines set values of the boost controller 8 for every operation point defined by the engine speed N and the fuel injection amount Q.

A second boost controller map M7 is map information applied in a case where the engine state λ is smaller than the threshold B and map information that defines set values of the boost controller 8 for every operation point defined by the engine speed N and the fuel injection amount Q.

The set values in the first boost controller map M6 are larger than the set values in the second boost controller map M7 and limitation to the boost controller 8 is made larger (that is, the maximum injection amount Qmax is made smaller) in a case where the second boost controller map M7 is applied (that is, a case where the engine state λ is smaller than the threshold B) than in a case where the first boost controller map M6 is applied (that is, a case where the engine state λ is smaller than the threshold A and exceeds the threshold B).

Described below is a reference value in a case where the EGR control is performed.

Examples of a reference value relating to the preceding number of revolutions Nn include the target number of revolutions Nset for determining whether the engine 1 has achieved the target number of revolutions, and the target number of revolutions Nset is preset.

Examples of a reference value relating to the number-of-revolutions deviation ΔNn include a number-of-revolutions deviation for determining whether the engine speed N is decreasing (hereinafter referred to as the "reference transient number-of-revolutions deviation") A1, and the reference transient number-of-revolutions deviation A1 is preset. The number of times the number-of-revolutions deviation ΔNn exceeds the reference transient number-of-revolutions deviation A1 (hereinafter referred to as the "transient number-of-revolutions deviation count") Xn is measured by the unillustrated counter included in the controller 7.

Examples of a reference value relating to the transient number-of-revolutions deviation count Xn include the number of times for determining whether it has been confirmed successively that the engine speed N is decreasing (hereinafter referred to as the "reference transient number-of-revolutions deviation count") X1, and the reference transient number-of-revolutions deviation count X1 is preset.

Examples of a reference value relating to the target number of revolutions deviation ΔNset include a number-of-revolutions deviation for determining whether the engine speed N has achieved the target number of revolutions Nset (hereinafter referred to as the "reference cancellation number-of-revolutions deviation") B1, and the reference cancellation number-of-revolutions deviation B1 is preset. The number of times the target number of revolutions deviation ΔNset falls below the reference cancellation number-of-revolutions deviation B1 (hereinafter referred to as the "cancellation number-of-revolutions deviation count") Yn is measured by the unillustrated counter included in the controller 7.

Examples of a reference value relating to the cancellation number-of-revolutions deviation count Yn include the number of times for determining whether it has been confirmed successively that the engine speed N has achieved the target number of revolutions Nset (hereinafter referred to as the "reference cancellation number-of-revolutions deviation count") Y1, and the reference cancellation number-of-revolutions deviation count Y1 is preset.

Examples of a reference value relating to the injection amount deviation ΔQn include an injection amount deviation for determining whether the fuel injection amount Q is increasing (hereinafter referred to as the "reference transient injection amount deviation") A2, and the reference transient injection amount deviation A2 is preset. The number of times the injection amount deviation ΔQn exceeds the reference transient injection amount deviation A2 (hereinafter referred to as the "transient injection amount deviation count") Xq is measured by the unillustrated counter included in the controller 7.

Examples of a reference value relating to the transient injection amount deviation count Xq include the number of times for determining whether it has been confirmed successively that the fuel injection amount Q is increasing (hereinafter referred to as the "reference transient injection amount deviation count") X2 and the reference transient injection amount deviation count X2 is preset.

Examples of a reference value relating to the injection amount deviation ΔQn include an injection amount deviation for determining whether the fuel injection amount Q is decreasing (hereinafter referred to as the "reference cancellation injection amount deviation") B2, and the reference cancellation injection amount deviation B2 is preset.

Examples of a reference value relating to the turbocharging pressure P include a turbocharging pressure for determining whether the turbocharging by the turbocharger 5 is sufficient (hereinafter referred to as the "reference turbocharging pressure") Pc. As the reference turbocharging pressure Pc, a turbocharging pressure calculated by multiplying a turbocharging pressure in a steady state (hereinafter referred to as the "steady-time turbocharging pressure") Ps by a certain ratio (hereinafter referred to as the "reset ratio") α is set.

The number of times the injection amount deviation ΔQn falls below the reference cancellation injection amount deviation B2 and the turbocharging pressure P becomes larger than or equal to the reference turbocharging pressure Pc (hereinafter referred to as the "cancellation injection amount deviation count") Yq is measured by the unillustrated counter included in the controller 7.

Examples of a reference value relating to the cancellation injection amount deviation count Yq include the number of times for determining whether it has been confirmed successively that the fuel injection amount Q is decreasing and that the turbocharging by the turbocharger 5 is sufficient (hereinafter referred to as the "reference cancellation injection amount deviation count") Y2, and the reference cancellation injection amount deviation count Y2 is preset.

Examples of a reference value relating to the elapsed time J include time for determining whether to open the EGR valve 43 (hereinafter referred to as the "reference time") Jc, and the reference time Jc is preset.

The target number of revolutions Nset, the reference transient number-of-revolutions deviation A1, the reference transient number-of-revolutions deviation count X1, the reference cancellation number-of-revolutions deviation B1, the reference cancellation number-of-revolutions deviation count Y1, the reference transient injection amount deviation A2, the reference transient injection amount deviation count X2, the reference cancellation injection amount deviation B2, the reference cancellation injection amount deviation count Y2, the reference turbocharging pressure Pc, and the reference time Jc described above are stored in the storage device 74. The storage device 74 further stores a control program for performing the EGR control according to a control procedure described below, and the like.

The control procedure of the EGR control is described below with reference to FIGS. 3 through 12.

Figure 6:
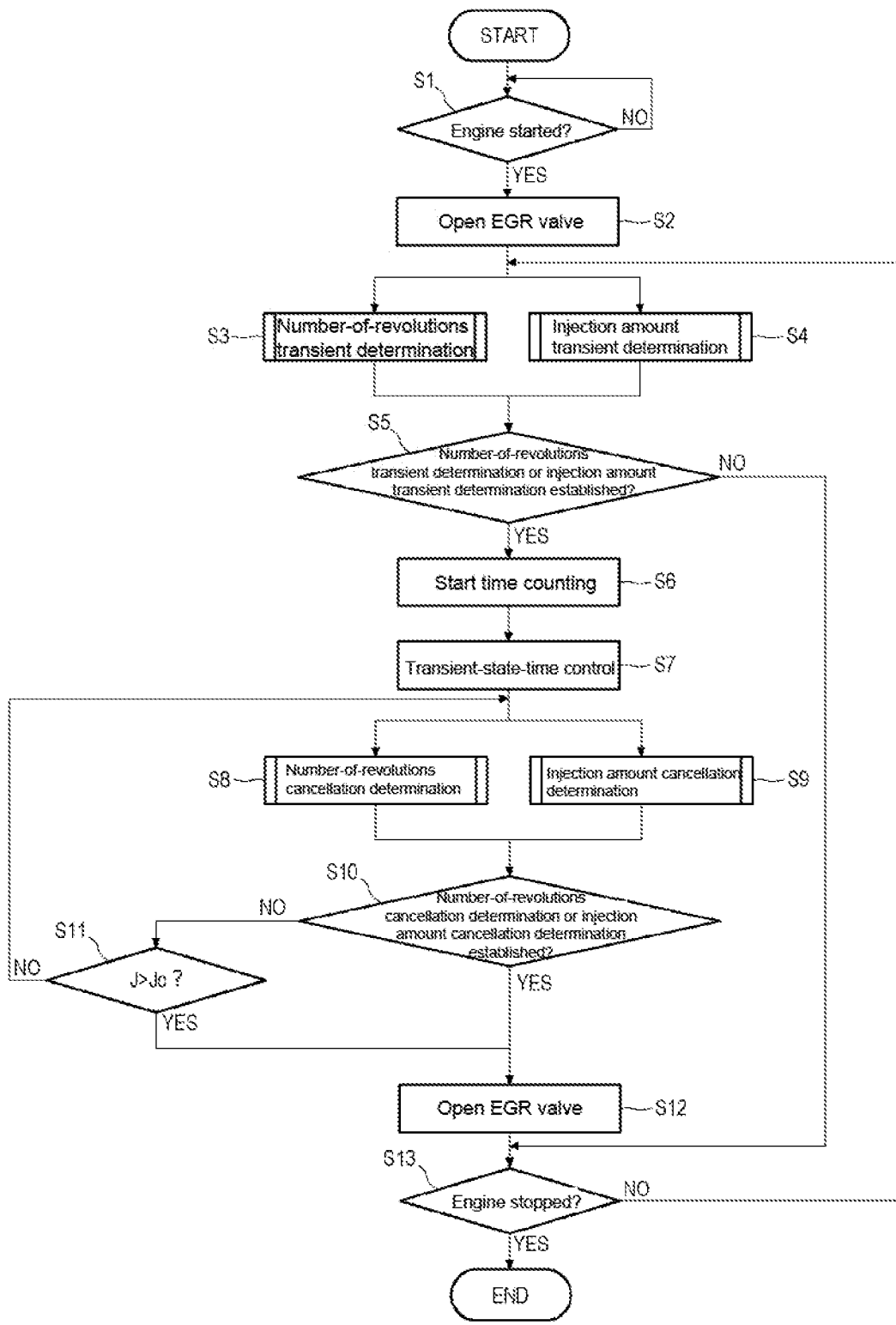
FIG. 6 is a flow chart illustrating a control procedure of EGR control.

As illustrated in FIG. 6, if the engine 1 is started (YES in step S1), the EGR valve 43 is opened at a predetermined opening (step S2) according to a signal from the controller 7 (see FIG. 1) and exhaust gas is caused to recirculate in intake air.

After that, determination for determining whether the engine 1 is in a transient state (hereinafter referred to as the "number-of-revolutions transient determination") based on a variation in the engine speed N (step S3), and determination for determining whether the engine 1 is in a transient state based on a variation in the fuel injection amount Q (hereinafter referred to as the "injection amount transient determination") (step S4) are performed. Thereafter, it is determined whether the determination has been established in at least one of the number-of-revolutions transient determination and the injection amount transient determination (step S5). The number-of-revolutions transient determination and the injection amount transient determination will be described in detail later.

If, in step S5, the determination is established in neither the number-of-revolutions transient determination (step S3) nor the injection amount transient determination (step S4) (NO in step S5) and if the engine 1 is operating (NO in step S13), the procedure of steps S3 through S5 is repeated until the determination becomes established in at least one of the number-of-revolutions transient determination (step S3) and the injection amount transient determination (step S4).

On the other hand, if, in step S5, the determination is established in at least one of the number-of-revolutions transient determination (step S3) and the injection amount transient determination (step S4) (YES in step S5), that is, if it is determined in at least one of the determinations that the engine 1 is in a transient state, the engine 1 is determined as being in a transient state. In this case, the timer of the controller 7 starts time counting of the elapsed time J (step S6) and then, the procedure proceeds to the transient-state-time control (step S7).

Figure 7:
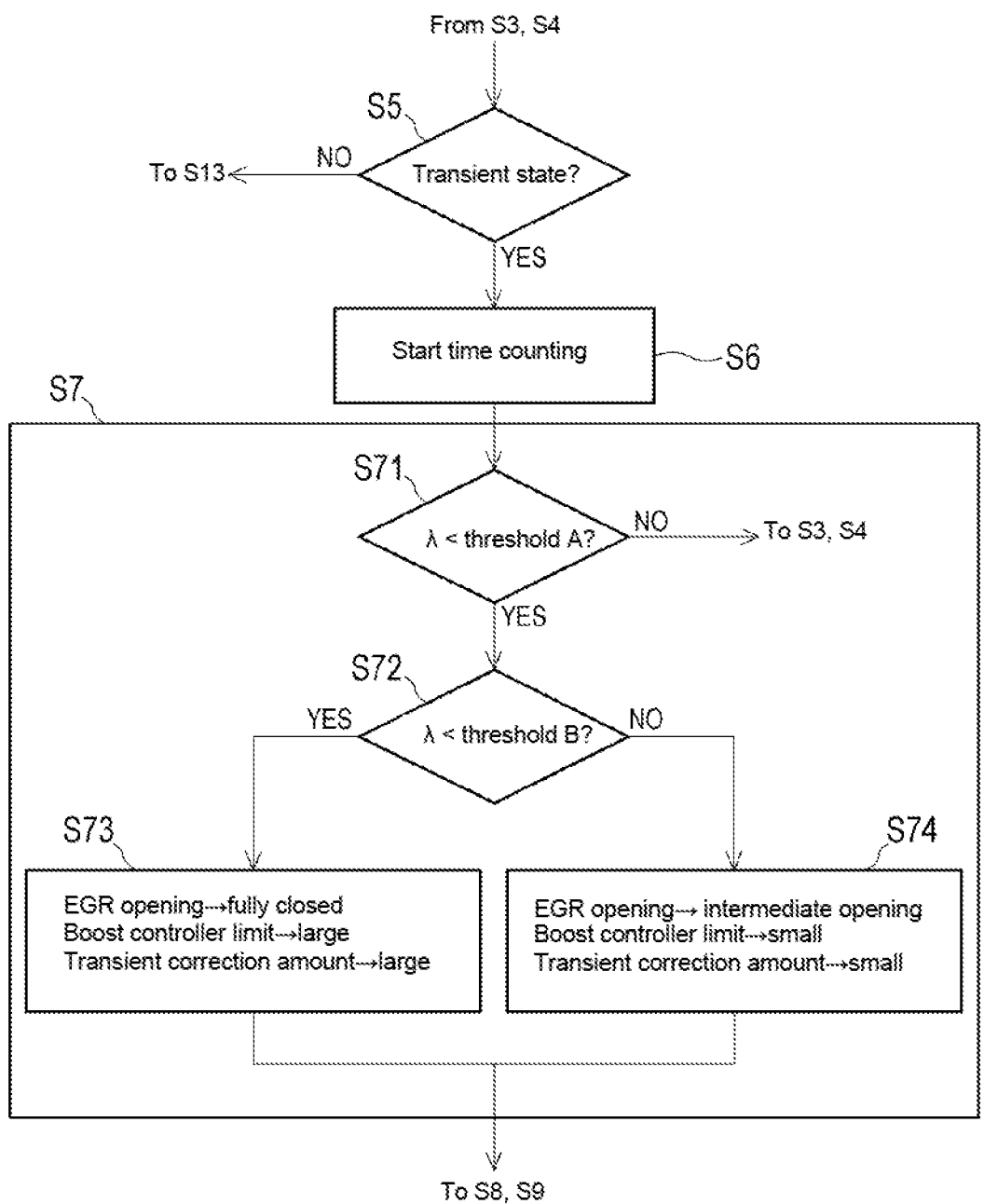
FIG. 7 is a flow chart illustrating a control procedure of transient-state-time control.

As illustrated in FIG. 7, if it is determined that the engine 1 is in a transient state, the procedure proceeds to the transient-state-time control (step S7). In the transient-state-time control (step S7), the controller 7 executes determination based on the excess air ratio λ as an indicator indicating the state of the engine 1.

In the method for controlling the engine 1 according to the embodiment of the present invention, the first threshold A and the second threshold B are set with the amount of smoke serving as a reference.

Figure 8:
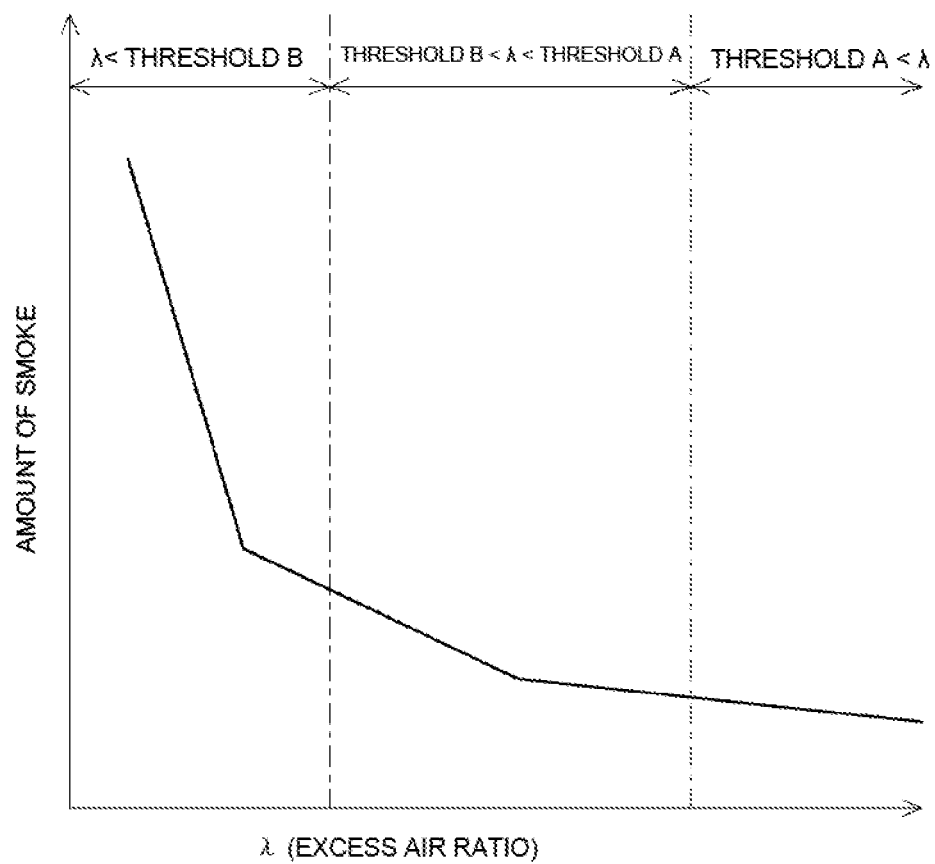
FIG. 8 is a graph illustrating relation between an excess air ratio and the amount of smoke and setting conditions of thresholds A and B based on the relation.

The excess air ratio λ and the amount of smoke are related such that, as illustrated in FIG. 8, the amount of smoke decreases with increase in the excess air ratio λ while the amount of smoke increases with decrease in the excess air ratio λ.

Thus, as illustrated in FIG. 8, if the excess air ratio λ is smaller than the threshold A and exceeds the threshold B, it is determined that the engine state still has an allowance for the amount of smoke and if the excess air ratio λ is smaller than the threshold B, it is determined that the engine state has no allowance for the amount of smoke.

Since the degree of allowance of the engine 1 for the amount of smoke differs, depending on the operation point, the thresholds A and B of the engine state λ are optimized for every operation point. Thus, the controller 7 further includes a map (not illustrated) for calculating the thresholds A and B based on the engine speed N and the fuel injection amount Q.

In the transient-time control (step S7), first, the controller 7 compares the engine state λ with the first threshold A (step S71).

If the engine state $\lambda$ is smaller than the threshold A (YES in step S71), the procedure proceeds to further determination based on the engine state $\lambda$ and the second threshold B (step S72).

If the engine state $\lambda$ indicates a value larger than or equal to the threshold A (NO in step S71), the procedure returns again to the determination on whether the engine 1 is in a transient state (steps S3 and S4).

In the determination based on the engine state $\lambda$ and the second threshold B (step S72), the engine state $\lambda$ is compared with the second threshold B.

If the engine state $\lambda$ is smaller than the threshold B (YES in step S72), the EGR valve 43 is fully closed and limitation of the boost controller 8 is increased (that is, the maximum injection amount Qmax is decreased), and further, a transient correction amount is increased (step S73).

If the engine state $\lambda$ indicates a value larger than or equal to the threshold B (NO in step S71), while maintaining the EGR valve 43 at an intermediate opening, the limitation of the boost controller 8 is decreased (that is, the maximum injection amount Qmax is increased) and further, the transient correction amount is decreased (step S74).

Described below is a method of controlling the EGR valve 43 at an intermediate opening.

In the transient-state-time control (YES in step S72), an intake air $O_2$ concentration is calculated so that the target NOx is achieved at every operation point, and the opening of the EGR valve 43 is calculated based on the air amount of each unit.

Specifically, in the intermediate opening control of the EGR valve 43, as illustrated in FIG. 3, the minimum $\lambda$ at the operation point (the engine speed and the fuel injection amount) at the timing is acquired from the minimum $\lambda$ map M2 and a target $O_2$ concentration for the minimum $\lambda$ (hereinafter referred to as the minimum target $O_2$ concentration) is calculated.

The minimum target $O_2$ concentration is calculated by firstly multiplying the fuel injection amount by the minimum $\lambda$, by the stoichiometric air-fuel ratio, and by the $O_2$ concentration to calculate the minimum target $O_2$ amount and then dividing the calculated minimum target $O_2$ amount by the value calculated by adding the intake air amount to an external EGR gas amount and an internal EGR gas amount and multiplying the result of the addition by a predetermined constant.

After that, in the intermediate opening control of the EGR valve 43, the minimum target NOx is calculated based on the calculated minimum target $O_2$ concentration.

In the intermediate opening control of the EGR valve 43, the calculated minimum target NOx is compared with the target value calculated from the normal target NOx base map M1 to select any one of the maximum values and further, a maximum limit process in which the maximum limit value calculated from the target NOx maximum value map M3 serves as an upper limit is performed, and the value obtained in this manner is employed as the final target NOx in the transient state. As illustrated in FIG. 3, if the engine 1 is not in a transient state, the target value calculated from the normal target NOx base map M1 is employed as the final target NOx.

In the intermediate opening control of the EGR valve 43 in the transient-state-time control (YES in step S72), the controller 7 calculates the intake air $O_2$ concentration that can achieve the final target NOx employed as described above for every operation point and calculates the opening of the EGR valve 43 based on the air amount of each unit.

In the method for controlling the engine 1 according to the embodiment of the present invention, as illustrated in FIGS. 5 and 7, the boost controller maps M6 and M7 are switched according to the engine state $\lambda$ (that is, according to the result of step S72, which is YES or NO).

That is, if the engine state $\lambda$ is smaller than the first threshold A and exceeds the second threshold B (NO in step S72), the first boost controller map M6 is employed, and if the engine state $\lambda$ is smaller than the second threshold B (YES in step S72), the second boost controller map M7 is employed. Accordingly, the amount of the limitation by the boost controller 8 is changed according to the engine state $\lambda$.

In the engine 1, the amounts of NOx emission and smoke emission can be reduced by the controller 7 controlling the EGR unit 4 and switching the boost controller maps M6 and M7 according to the engine state $\lambda$.

That is, the control of the EGR valve 43 and the boost controller 8 in the method for controlling the engine 1 according to the embodiment of the present invention includes step S71 as a first step in which the excess air ratio $\lambda$ is compared with the first threshold A, and step S72 as a second step in which if the excess air ratio $\lambda$ is smaller than the first threshold A, the excess air ratio $\lambda$ is compared with the second threshold B, and if, in step S71, the excess air ratio $\lambda$ is larger than or equal to the threshold A, the EGR unit 4 and the boost controller 8 are maintained in a steady operation state, and if, in step S72, the excess air ratio $\lambda$ is larger than or equal to the threshold B, the limitation of the boost controller 8 is decreased while opening the EGR valve 43 of the EGR unit 4 at an intermediate opening and, and if the excess air ratio $\lambda$ is smaller than the threshold B, the limitation of the boost controller 8 is increased while fully closing the EGR valve 43.

Since the above-described method for controlling the engine 1 may avoid the EGR valve 43 being fully closed in a transient state, a period during which the EGR valve 43 is fully closed can be shortened and the operation state in which no smoke is caused can be maintained. Accordingly, the amounts of NOx emission and smoke emission can be further reduced. In addition, response of the engine 1 may be secured by controlling the limitation by the boost controller 8.

Further, in the method for controlling the engine 1 according to the embodiment of the present invention, as illustrated in FIGS. 4 and 7, the correction amount maps M4 and M5 are switched according to the engine state $\lambda$ (that is, according to the result of step S72, which is YES or NO). The set values in the first correction amount map M4 are smaller than the set values in the second correction amount map M5.

That is, if the engine state $\lambda$ is smaller than the first threshold A and exceeds the second threshold B (NO in step S72), the first correction amount map M4 is employed and if the engine state $\lambda$ is smaller than the second threshold B (YES in step S72), the second correction amount map M5 is employed. As described above, in the method for controlling the engine 1 according to the embodiment of the present invention, the correction amount for correcting the control map 75 is changed according to the engine state $\lambda$.

In the engine 1, the amount of smoke emission can be reduced by switching the correction amount maps M4 and M5 according to the engine state $\lambda$.

That is, in the method for controlling the engine 1 according to the embodiment of the present invention, the controller 7 corrects the control map 75 according to the excess air ratio $\lambda$, and, in step S72, if the excess air ratio $\lambda$ is larger than or equal to the threshold B, the correction amount to the control map 75 is decreased, and if the excess air ratio λ is smaller than the threshold B, the correction amount to the control map 75 is increased.

By the above-described method for controlling the engine 1, an operation state in which the amount of NOx emission is reduced can be maintained with reliability and accordingly, the amount of NOx emission can be reduced with higher reliability.

If the determination based on the comparison between the engine state λ and the threshold B is completed, the procedure proceeds to determination on whether the transient state has ended (step S8, S9).

Subsequently, as illustrated in FIG. 6, determination for determining whether the transient state has been canceled based on a variation in the engine speed N (hereinafter referred to as the "number-of-revolutions cancellation determination") (step S8) and determination for determining whether the transient state has been canceled based on a variation in the fuel injection amount Q (hereinafter referred to as the "injection amount cancellation determination") (step S9) are performed, and then it is determined whether the determination has been established in both the number-of-revolutions cancellation determination and the injection amount cancellation determination (step S10). The number-of-revolutions cancellation determination and the injection amount cancellation determination will be described in detail later.

In step S10, if the determination is established in both the number-of-revolutions cancellation determination (step S8) and the injection amount cancellation determination (step S9) (YES in step S10), that is, if it is determined in both of the determinations that the transient state has been canceled, the EGR valve 43 is opened at a predetermined opening according to a signal from the controller 7 (step S12) and the control for the steady state time is resumed and after that, if the engine 1 is operating (NO in step S13), the procedure of step S3 and the steps thereafter is repeated.

On the other hand, if, in step S10, the determination fails to be established in at least one of the number-of-revolutions cancellation determination (step S8) and the injection amount cancellation determination (step S9) (NO in step S10), it is determined whether the elapsed time J is longer than the reference time Jc (step S11).

If the elapsed time J is longer than the reference time Jc (YES in step S11), the EGR valve 43 is opened at a predetermined opening according to a signal from the controller 7 (step S12) and the EGR control for a steady state is resumed. After that, if the engine 1 is operating (NO in step S13), the procedure of steps S3 and S4 and the steps thereafter is repeated.

If the elapsed time J is shorter than or equal to the reference time Jc (NO in step S11), the procedure of steps S8 and S9 and the steps thereafter is repeated without the procedure proceeding to the EGR control for a steady state.

That is, the method for controlling the engine 1 according to the embodiment of the present invention includes steps S8 and S9 after the end of step S72 as a third step in which the controller 7 determines whether the engine 1 is in a transient state.

By the above-described method for controlling the engine 1, the control for a steady state may be recovered immediately after exit from a transient state and accordingly, a period during which the EGR valve 43 is fully closed can be shortened. As a result, the amounts of NOx emission and smoke emission can be further reduced.

The number-of-revolutions transient determination (step S3) is described below.

Figure 9:
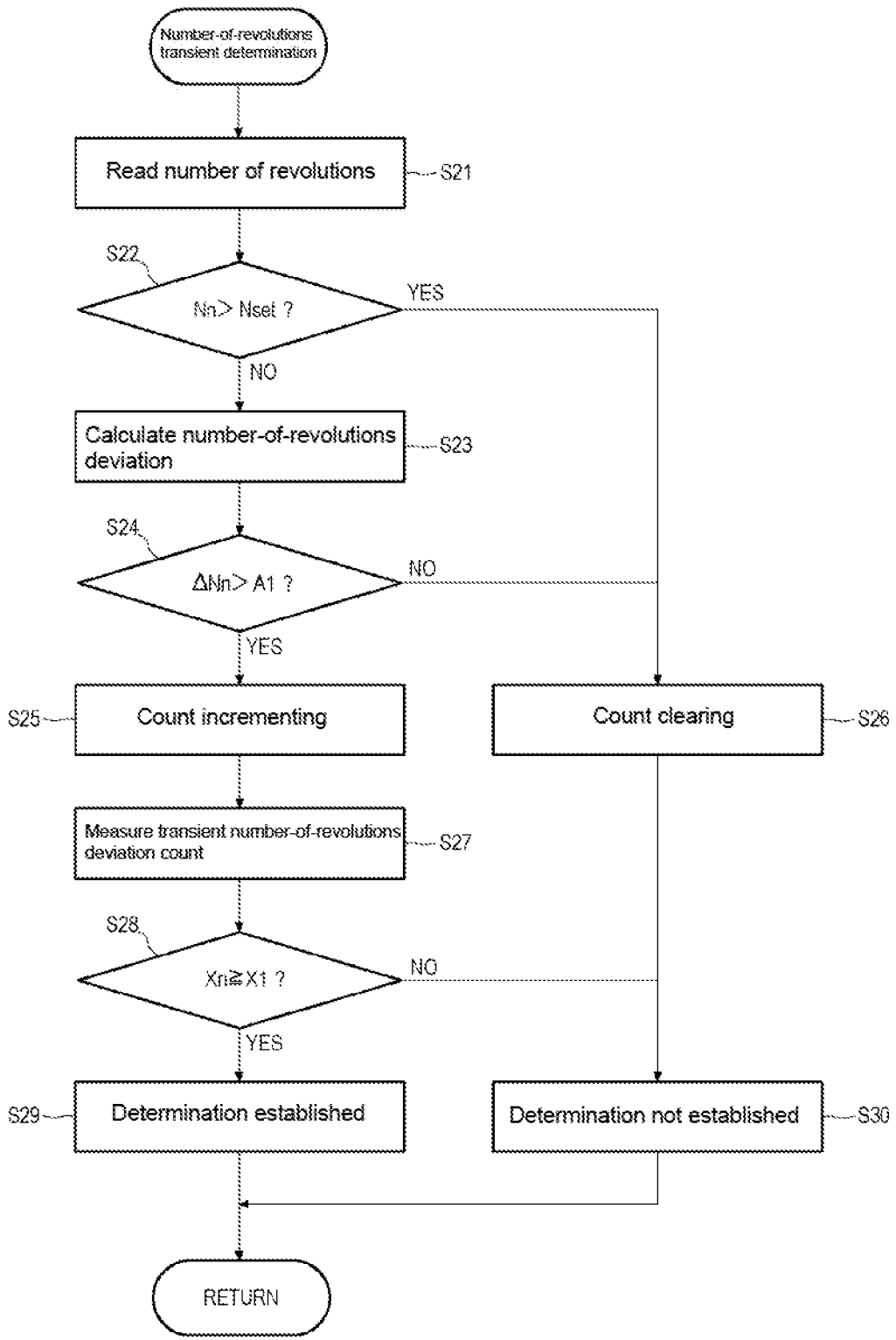
FIG. 9 is a flow chart illustrating a control procedure of number-of-revolutions transient determination.

As illustrated in FIG. 9, if the number-of-revolutions transient determination (step S3) is started, a number-of-revolutions signal detected at every predetermined time is read whenever necessary (step S21), and it is determined whether the preceding number of revolutions Nn is larger than the target number of revolutions Nset (step S22).

If the preceding number of revolutions Nn is smaller than or equal to the target number of revolutions Nset (NO in step S22), it is determined that the target number of revolutions has not been achieved, and calculation of the number-of-revolutions deviation ΔNn continues (step S23) and it is determined whether the number-of-revolutions deviation ΔNn is larger than the reference transient number-of-revolutions deviation A1 (step S24). As described above, the number-of-revolutions deviation ΔNn indicates the value (=Nn−1−Nn) that is calculated by subtracting the preceding number of revolutions Nn from the previous number of revolutions Nn−1.

If the number-of-revolutions deviation ΔNn exceeds the reference transient number-of-revolutions deviation A1 (YES in step S24), it is determined that the engine speed N is decreasing, and incrementing by one (hereinafter referred to as the "count incrementing") is performed on the transient number-of-revolutions deviation count Xn (step S25). Accordingly, the transient number-of-revolutions deviation count Xn after the count incrementing is measured by the counter of the controller 7 (step S27) and it is determined whether the transient number-of-revolutions deviation count Xn is larger than or equal to the reference transient number-of-revolutions deviation count X1 (step S28).

If the transient number-of-revolutions deviation count Xn is larger than or equal to the reference transient number-of-revolutions deviation count X1 (YES in step S28), it is determined that it has been confirmed successively that the engine speed N is decreasing, and it is determined that the determination has been established, that is, that the engine 1 is in a transient state (step S29).

If the transient number-of-revolutions deviation count Xn falls below the reference transient number-of-revolutions deviation count X1 (NO in step S28), it is determined that it has failed to confirm successively that the engine speed N is decreasing, and it is determined that the determination has failed to be established, that is, that the engine is not in a transient state (step S30).

If the preceding number of revolutions Nn exceeds the target number of revolutions Nset (YES in step S22), it is determined that the target number of revolutions has been achieved, and if the number-of-revolutions deviation ΔNn is smaller than or equal to the reference transient number-of-revolutions deviation A1 (NO in step S24), it is determined that the engine speed is not decreasing. In both cases, returning the state to a state of zero (hereinafter referred to as the "count clearing") is performed on the transient number-of-revolutions deviation count Xn (step S26) and it is determined that the determination has failed to be established, that is, it is determined that the engine is not in a transient state (step S30).

The injection amount transient determination (step S4) is described below.

Figure 10:
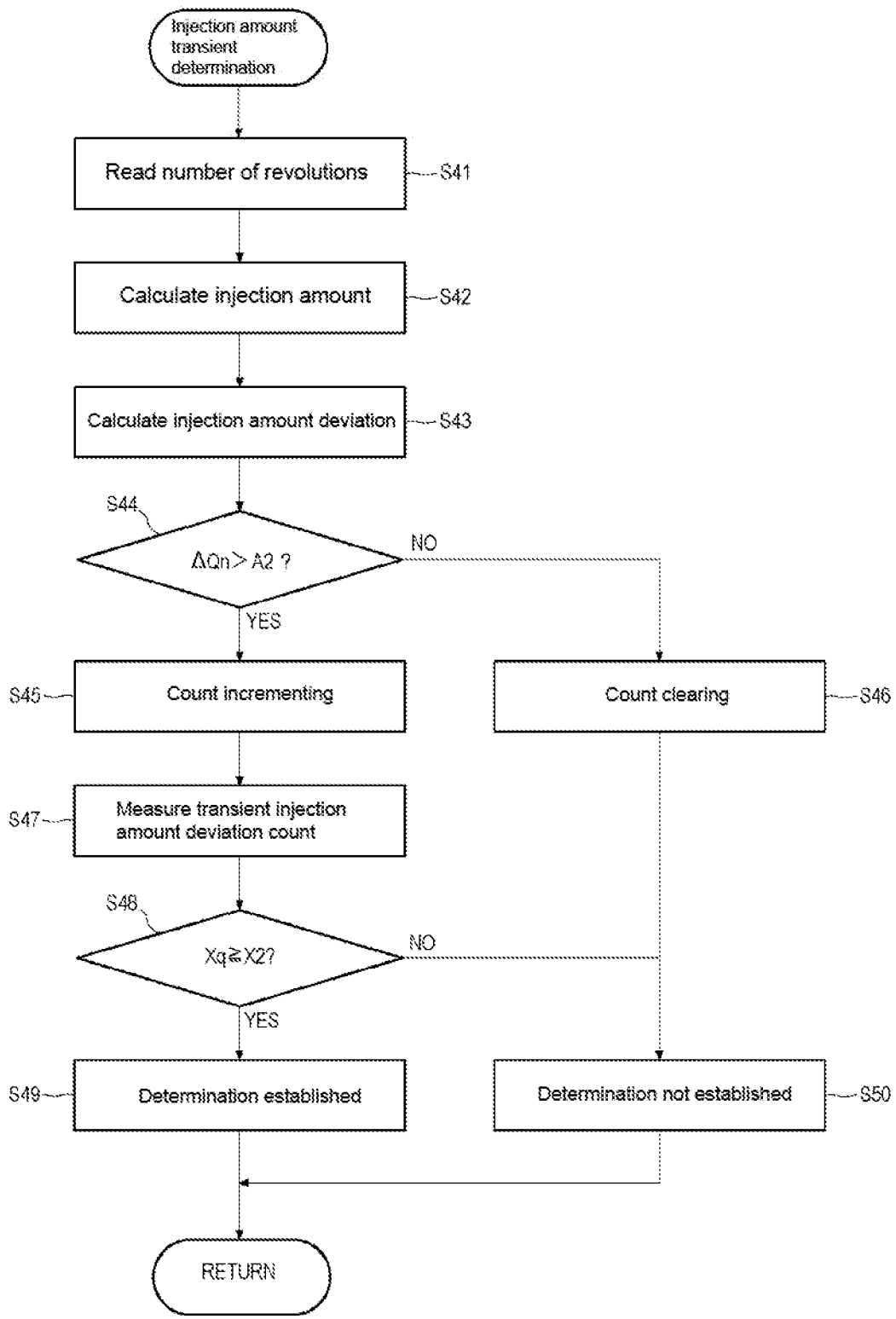
FIG. 10 is a flow chart illustrating a control procedure of injection amount transient determination.

As illustrated in FIG. 10, if the injection amount transient determination (step S4) is started, a number-of-revolutions signal detected at every predetermined time is read whenever necessary (step S41). Accordingly, the fuel injection amount Q dependent on the engine speed N is calculated in accordance with the control map 75 at every predetermined time (step S42) and subsequently, the injection amount deviation ΔQn is calculated (step S43), and it is determined whether the injection amount deviation ΔQn is larger than the reference transient injection amount deviation A2 (step S44). As described above, the injection amount deviation ΔQn indicates the value (Qn−Qn−1) that is calculated by subtracting the previous injection amount Qn−1 from the preceding injection amount Qn.

If the injection amount deviation ΔQn exceeds the reference transient injection amount deviation A2 (YES in step S44), it is determined that the fuel injection amount Q is increasing and the count incrementing is performed on the transient injection amount deviation count Xq (step S45). Accordingly, the transient injection amount deviation count Xp after the count incrementing is measured by the counter of the controller 7 (step S47) and it is determined whether the transient injection amount deviation count Xp is larger than or equal to the reference transient injection amount deviation count X2 (step S48).

If the transient injection amount deviation count Xp is larger than or equal to the reference transient injection amount deviation count X2 (YES in step S48), it is determined that it has been confirmed successively that the fuel injection amount Q is increasing, and it is determined that the determination has been established, that is, that the engine is in a transient state (step S49).

On the other hand, if the transient injection amount deviation count Xp falls below the reference transient injection amount deviation count X2 (NO in step S48), it is determined that it has failed to confirm successively that the fuel injection amount Q is increasing, that is, it is determined that the engine 1 is not in a transient state (step S50).

If the injection amount deviation ΔQn is smaller than or equal to the reference transient injection amount deviation A2 (NO in step S44), it is determined that the fuel injection amount Q is not increasing, and the count clearing is performed on the transient injection amount deviation count Xq (step S46) and then, it is determined that the determination has failed to be established, that is, that the engine 1 is not in a transient state (step S50).

The number-of-revolutions cancellation determination (step S8) is described below.

Figure 11:
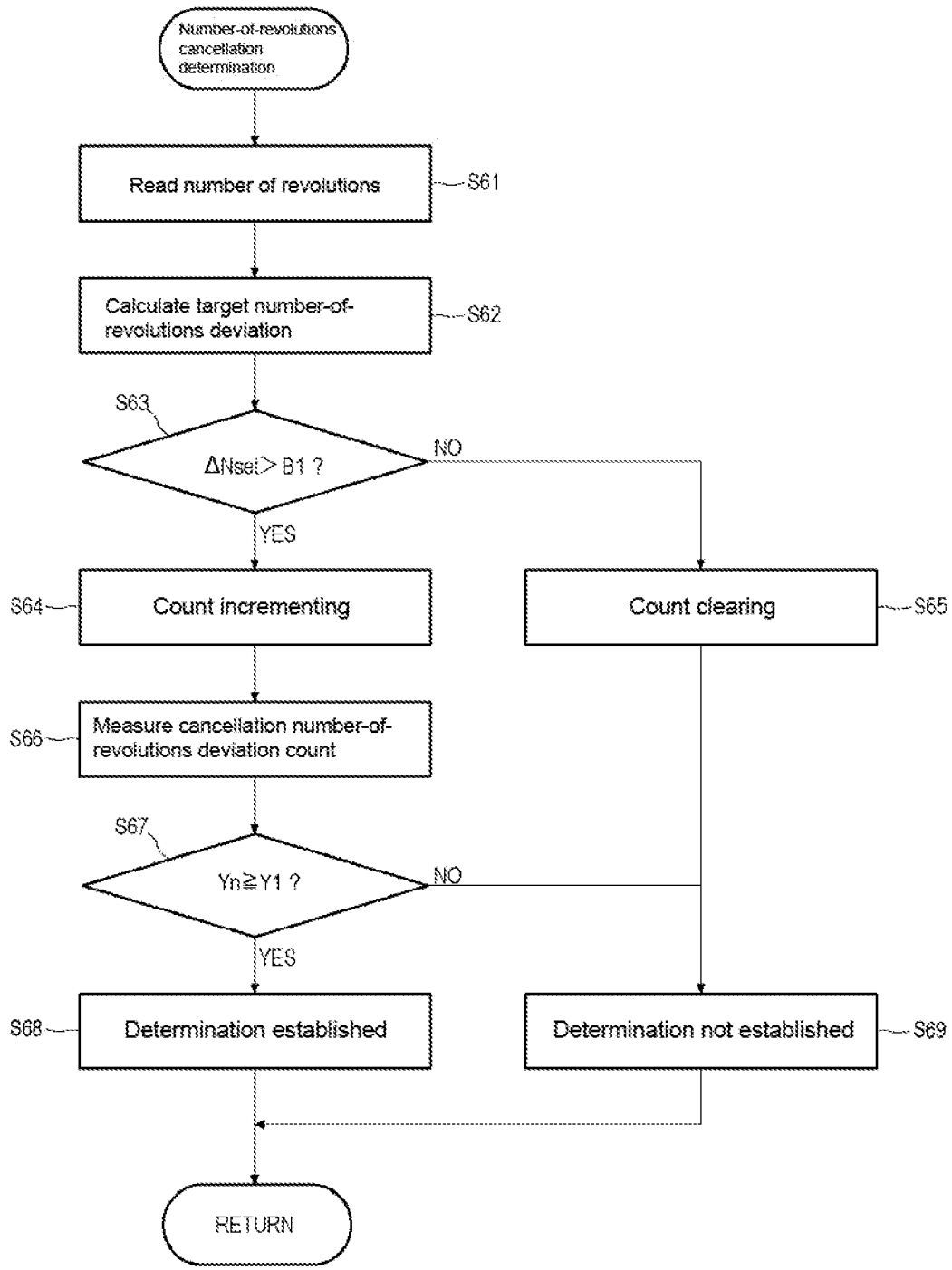
FIG. 11 is a flow chart illustrating a control procedure of number-of-revolutions cancellation determination.

As illustrated in FIG. 11, if the number-of-revolutions cancellation determination (step S8) is started, a number-of-revolutions signal detected at every predetermined time is read whenever necessary (step S61) and subsequently, the target number of revolutions deviation ΔNset is calculated (step S62), and it is determined whether the target number of revolutions deviation ΔNset is smaller than the reference cancellation number-of-revolutions deviation B1 (step S63). As described above, the target number of revolutions deviation ΔNset indicates the value (=Nset−Nn) that is calculated by subtracting the preceding number of revolutions Nn from the target number of revolutions Nset.

If the target number of revolutions deviation ΔNset falls below the reference cancellation number-of-revolutions deviation B1 (YES in step S63), it is determined that the engine speed N has achieved the target number of revolutions Nset and the count incrementing is performed on the cancellation number-of-revolutions deviation count Yn (step S64). Accordingly, the cancellation number-of-revolutions deviation count Yn after the count incrementing is measured by the counter of the controller 7 (step S66) and it is determined whether the cancellation number-of-revolutions deviation count Yn is larger than or equal to the reference cancellation number-of-revolutions deviation count Y1 (step S67).

If the cancellation number-of-revolutions deviation count Yn is larger than or equal to the reference cancellation number-of-revolutions deviation count Y1 (YES in step S67), it is determined that it has been confirmed successively that the engine speed N has achieved the target number of revolutions Nset and it is determined that the determination has been established, that is, that the transient state has been canceled (step S68).

On the other hand, if the cancellation number-of-revolutions deviation count Yn falls below the reference cancellation number-of-revolutions deviation count Y1 (NO in step S67), it is determined that it has failed to confirm successively that the engine speed N has achieved the target number of revolutions Nset, and it is determined that the determination has failed to be established, that is, that the transient state has not been canceled (step S69).

If the target number of revolutions deviation ΔNset is larger than or equal to the reference cancellation number-of-revolutions deviation B1 (NO in step S63), it is determined that the engine speed N has not achieved the target number of revolutions Nset, and the count clearing is performed on the cancellation number-of-revolutions deviation count Yn (step S65) and then, it is determined that the determination has failed to be established, that is, that the transient state has not been canceled (step S69).

The injection amount cancellation determination (step S9) is described below.

Figure 12:
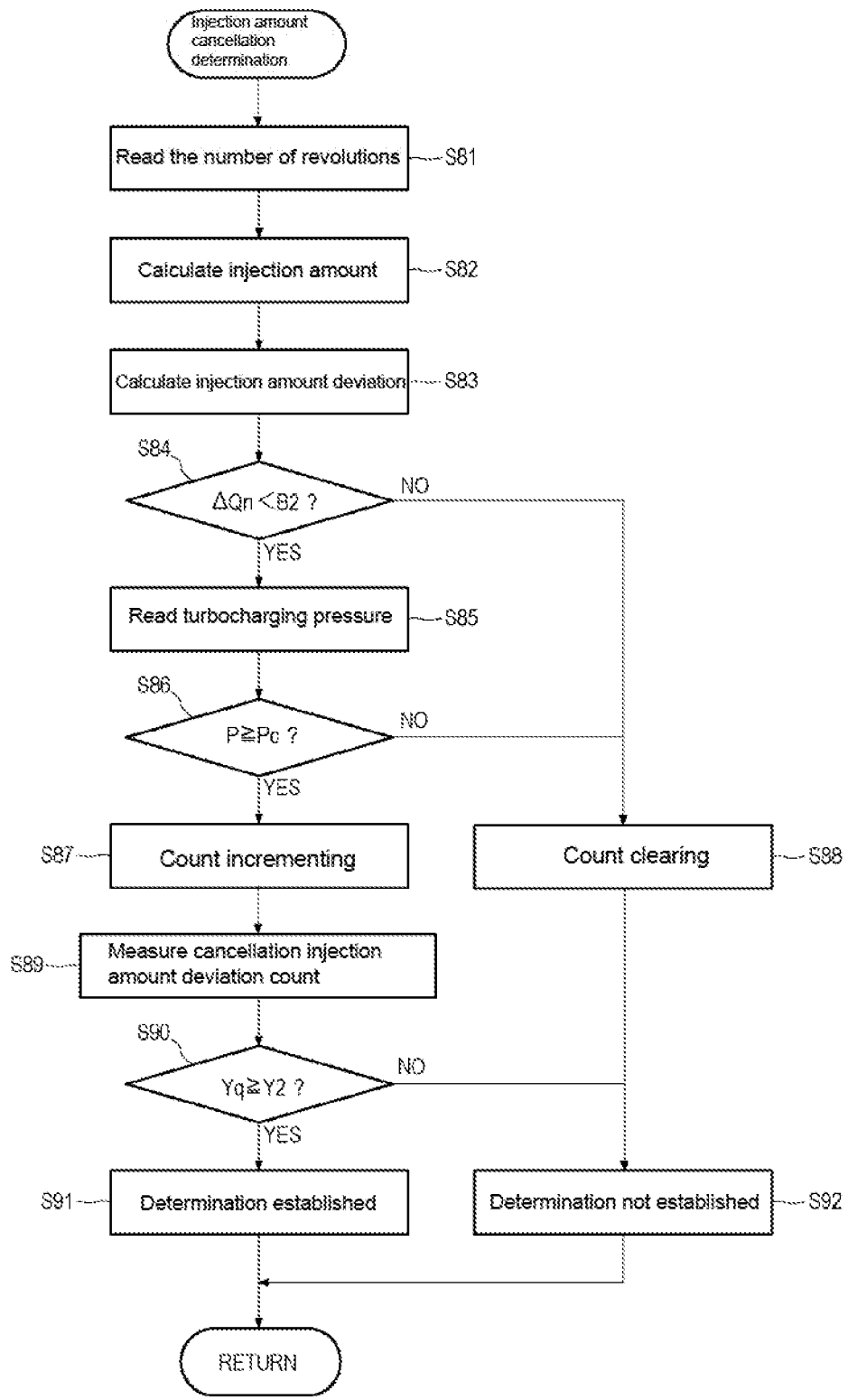
FIG. 12 is a flow chart illustrating a control procedure of injection amount cancellation determination.
Figure 13:
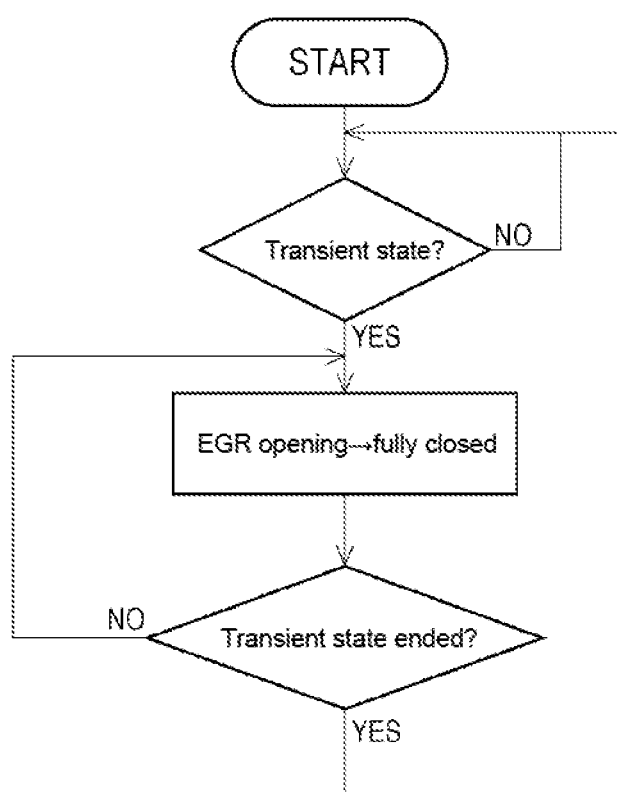
FIG. 13 is a flow chart illustrating a control procedure of conventional EGR control.

As illustrated in FIG. 12, if the injection amount cancellation determination (step S9) is started, a number-of-revolutions signal detected at every predetermined time is read whenever necessary (step S81). After that, the fuel injection amount Q dependent on the engine speed N is calculated in accordance with the control map 75 at every predetermined time (step S82) and subsequently, the injection amount deviation ΔQn is calculated (step S83), and it is determined whether the injection amount deviation ΔQn is smaller than the reference cancellation injection amount deviation B2 (step S84). As described above, the injection amount deviation ΔQn indicates the value (Qn−Qn−1) that is calculated by subtracting the previous injection amount Qn−1 from the preceding injection amount Qn.

If the injection amount deviation ΔQn falls below the reference cancellation injection amount deviation B2 (YES in step S84), it is determined that the fuel injection amount Q is decreasing and subsequently, the turbocharging pressure P is read (step S85), and it is determined whether the turbocharging pressure P is larger than or equal to the reference turbocharging pressure Pc (step S86). As described above, the reference turbocharging pressure Pc indicates the value (Ps×α) that is calculated by multiplying the steady-time turbocharging pressure Ps by the reset ratio α.

If the turbocharging pressure P is larger than or equal to the reference turbocharging pressure Pc (YES in step S86), it is determined that the turbocharging by the turbocharger 5 is sufficient, and the count incrementing is performed on the cancellation injection amount deviation count Yq (step S87). Accordingly, the cancellation injection amount deviation count Yq after the count incrementing is measured by the counter of the controller 7 (step S89) and it is determined whether the cancellation injection amount deviation count Yq is larger than or equal to the reference cancellation injection amount deviation count Y2 (step S90).

If the cancellation injection amount deviation count Yq is larger than or equal to the reference cancellation injection amount deviation count Y2 (YES in step S90), it is determined that it has been confirmed successively that the fuel injection amount Q is decreasing and that the turbocharging by the turbocharger 5 is sufficient, and it is determined that the determination has been established, that is, the transient state has been canceled (step S91).

If the cancellation injection amount deviation count Yq falls below the reference cancellation injection amount deviation count Y2 (NO in step S90), it is determined that it has failed to confirm successively that the fuel injection amount Q is decreasing and that the turbocharging by the turbocharger 5 is sufficient, and it is determined that the determination has failed to be established, that is, that the transient state has not been canceled (step S92).

If the injection amount deviation ΔQn is larger than or equal to the reference cancellation injection amount deviation B2 (NO in step S84), it is determined that the fuel injection amount Q is not decreasing and if the turbocharging pressure P falls below the reference turbocharging pressure Pc (NO in step S86), it is determined that the turbocharging by the turbocharger 5 is insufficient. In both cases, the count clearing is performed on the cancellation injection amount deviation count Yq (step S88) and then, it is determined that the determination fails to be established (step S92).

As described above, in the engine 1 including the common-rail fuel injection unit 3 that injects fuel, the number-of-revolutions sensor 71 that detects the engine speed N, and the controller 7 to which the common-rail fuel injection unit 3 and the number-of-revolutions sensor 71 are connected, based on the control map 75 that defines relation between the engine speed N and the fuel injection amount Q of the common-rail fuel injection unit 3, the controller 7 calculates the fuel injection amount Q dependent on the engine speed N, calculates the injection amount deviation ΔQn as the increase in the fuel injection amount Q per unit time, and determines that the engine 1 is in a transient state if the injection amount deviation ΔQn exceeds the reference transient injection amount deviation A2 as the reference injection amount deviation.

Further, the controller 7 determines that the engine 1 is in a transient state if the transient injection amount deviation count Xq as the number of times the injection amount deviation ΔQn exceeds the reference transient injection amount deviation A2 is larger than or equal to the reference transient injection amount deviation count X2 as the reference number of times.

That is, according to the embodiment of the present invention, in the method for controlling the engine 1 including the common-rail fuel injection unit 3, the boost controller 8 that limits the maximum injection amount Qmax of the common-rail fuel injection unit 3, the EGR unit 4 that causes exhaust gas to recirculate in the intake pipe 25, and the controller 7 that controls the boost controller 8 and the EGR unit 4, based on the control map 75 of the engine speed N and the fuel injection amount Q of the common-rail fuel injection unit 3, the controller 7 calculates the fuel injection amount Q dependent on the engine speed N, calculates the injection amount deviation ΔQn as a fuel injection amount increase, and determines that the engine 1 is in a transient state if the injection amount deviation ΔQn exceeds the reference transient injection amount deviation A2 as a predetermined reference injection amount deviation or if the transient injection amount deviation count Xq as the number of times the injection amount deviation ΔQn exceeds the reference transient injection amount deviation A2 is larger than or equal to the reference transient injection amount deviation count X2 as a reference number of times, and if it is determined that the engine 1 is in the transient state, the controller 7 controls the EGR unit 4 and the boost controller 8 according to the excess air ratio λ that is an indicator indicating a state of the engine 1.

By the above-described method for controlling the engine 1, the amounts of NOx emission and smoke emission from the engine 1 in a transient state can be reduced.

Although the present embodiment employ the common-rail fuel injection unit 3 as the fuel injection unit, a fuel injection pump that includes an electronic governor may be employed instead.

REFERENCE SIGNS LIST 1 engine
3 common-rail fuel injection unit
4 EGR unit
7 controller
8 boost controller
43 EGR valve
75 control map
N engine speed
Q fuel injection amount
λ excess air ratio (engine state)

The invention claimed is:

1. A method for operating a controller of an engine, the method comprising:
at a controller coupled to an engine including a fuel injection unit and an exhaust gas recirculation (EGR) unit configured to cause exhaust gas to recirculate in an intake pipe, performing:
calculating a fuel injection amount based on an engine speed using a control map of the engine speed and the fuel injection amount of the fuel injection unit;
calculating an injection amount deviation based on the calculated fuel injection amount;
determining that a number of times the injection amount deviation exceeds a reference transient injection amount deviation is greater than or equal to a reference number of times;
determining that the engine is in a transient state in response to determining that the number of times is greater than or equal to the reference number of times; and
based on the determination that the engine is in the transient state:
calculating an excess air ratio that is an indicator of a state of the engine; and
controlling the EGR unit and the fuel injection unit according to the excess air ratio.

2. A method for operating a controller of an engine, the method comprising:
at a controller coupled to an engine including a fuel injection unit and an exhaust gas recirculation (EGR) unit configured to cause exhaust gas to recirculate in an intake pipe, performing:
calculating a fuel injection amount based on an engine speed using a control map of the engine speed and the fuel injection amount of the fuel injection unit;
calculating an injection amount deviation as a fuel injection amount increase;
determining that a number of times the infection amount deviation exceeds a reference transient infection amount deviation is greater than or equal to a reference number of times;
determining that the engine is in a transient state in response to determining that the number of times is greater than or equal to the reference number of times;

based on the determination that the engine is in the transient state:
calculating an excess air ratio that is an indicator of a state of the engine; and
controlling the EGR unit and the fuel injection unit according to the excess air ratio;
comparing the excess air ratio with a first threshold,
based on the excess air ratio being greater than or equal to the first threshold, maintaining the EGR unit and the fuel injection unit in a steady operation state;
based on the excess air ratio being less than the first threshold, comparing the excess air ratio with a second threshold; and
based on a determination that the excess air ratio is greater than or equal to the second threshold, increasing a maximum injection amount of the fuel injection unit and opening an EGR valve of the EGR unit at an intermediate opening; or
based on the excess air ratio being less than the second threshold, decreasing the maximum injection amount and fully closing the EGR valve.

3. The method according to claim 1, further comprising:
comparing the excess air ratio with a first threshold,
based on the excess air ratio being greater than or equal to the first threshold, maintaining the EGR unit and the fuel injection unit in a steady operation state; or
based on the excess air ratio being less than the first threshold, comparing the excess air ratio with a second threshold.

4. The method according to claim 2, further comprising:
correcting the control map according to the excess air ratio, and
based on the excess air ratio being greater than or equal to the second threshold, decreasing a correction amount of the control map; or
based on the excess air ratio being less than the second threshold, increasing the correction amount of the control map.

5. The method according to claim 2, further comprising:
after the excess air ratio is compared with the second threshold, determining whether the engine is in the transient state.

6. The method according to claim 3, further comprising, based on a determination that the excess air ratio is less than the first threshold:
based on the excess air ratio being greater than or equal to the second threshold, increasing a maximum injection amount of the fuel injection unit and moving an EGR valve of the EGR unit to an intermediate opening.

7. The method according to claim 6, further comprising, based on the determination that the excess air ratio is less than the first threshold:
based on the excess air ratio being less than the second threshold, decreasing the maximum injection amount and fully closing the EGR valve.

8. A system for controlling an engine, the system comprising:
a controller configured to be coupled to an engine having an injector and an exhaust gas recirculation (EGR) valve, the controller further configured to:
set a first control map;
calculate, during operation of the engine, a fuel injection amount based on the first control map for a speed of the engine at different operational times;
for each fuel injection amount after an initial injection amount:
calculate an injection amount deviation based on the fuel injection amount and a previous fuel injection amount;
compare the injection amount deviation to a predetermined injection deviation; and
based on the injection amount deviation being greater than or equal to the predetermined injection deviation, adjust a deviation count;
compare the deviation count to a count threshold; and
based on the deviation count satisfying the count threshold, operate the engine in a transient state; and
based on the engine being in a transient state:
calculate an excess air ratio; and
control the EGR valve and the injector according to the excess air ratio.

9. The system according to claim 8, wherein the injection amount deviation is based on a difference between the fuel injection amount and the previous fuel injection amount.

10. The system according to claim 8, wherein based on the engine being in a transient state, the controller is further configured to:
compare the excess air ratio to a first threshold.

11. The system according to claim 10, wherein based on the engine being in the transient state, the controller is further configured to:
based on the excess air ratio being greater than or equal to the first threshold, maintain the EGR valve and a maximum injection amount of the injector.

12. The system according to claim 8, wherein based on the engine being in a transient state, the controller is further configured to:
compare the excess air ratio to a first threshold;
based on the excess air ratio being less than the first threshold, compare the excess air ratio with a second threshold; and
based on the excess air ratio being greater than or equal to the second threshold, increase a maximum injection amount of the injector and move the EGR valve at an intermediate opening.

13. The system according to claim 12, wherein, after the excess air ratio is compared with the second threshold, the controller is further configured to:
determine whether the engine is in the transient state.

14. The system according to claim 12, wherein the controller configured to set the first threshold and the second threshold based on an amount of smoke.

15. The system according to claim 14, wherein:
the amount of smoke is calculated based on the excess air ratio; and
for each fuel injection amount after the initial injection amount:
the previous fuel injection amount is a most recently calculated fuel injection amount with respect to the fuel injection amount.

16. The system according to claim 12, wherein the controller is further configured to:
update the first control map according to the excess air ratio; and
based on the excess air ratio being greater than or equal to the second threshold, select a second control map having a decreased correction amount.

17. The system according to claim 12, wherein the controller is further configured to:
update the first control map according to the excess air ratio; and based on the excess air ratio being less than the second threshold, select a third control map having an increased correction amount.

18. The system according to claim 8, wherein based on the engine being in a transient state, the controller is further configured to:
  compare the excess air ratio to a first threshold;
  based on the excess air ratio being less than the first threshold, compare the excess air ratio with a second threshold; and
  based on the excess air ratio being less than the second threshold, decrease a maximum injection amount of the injector and fully close the EGR valve.

19. The system according to claim 18, wherein the controller is further configured to:
  update the first control map according to the excess air ratio, and
  based on the excess air ratio being greater than or equal to the second threshold, select a second control map having a decreased correction amount.

20. The system according to claim 18, wherein the controller is further configured to:
  update the first control map according to the excess air ratio, and
  based on the excess air ratio being less than the second threshold, select a third control map having an increased correction amount.

* * * * *